Figure 1:
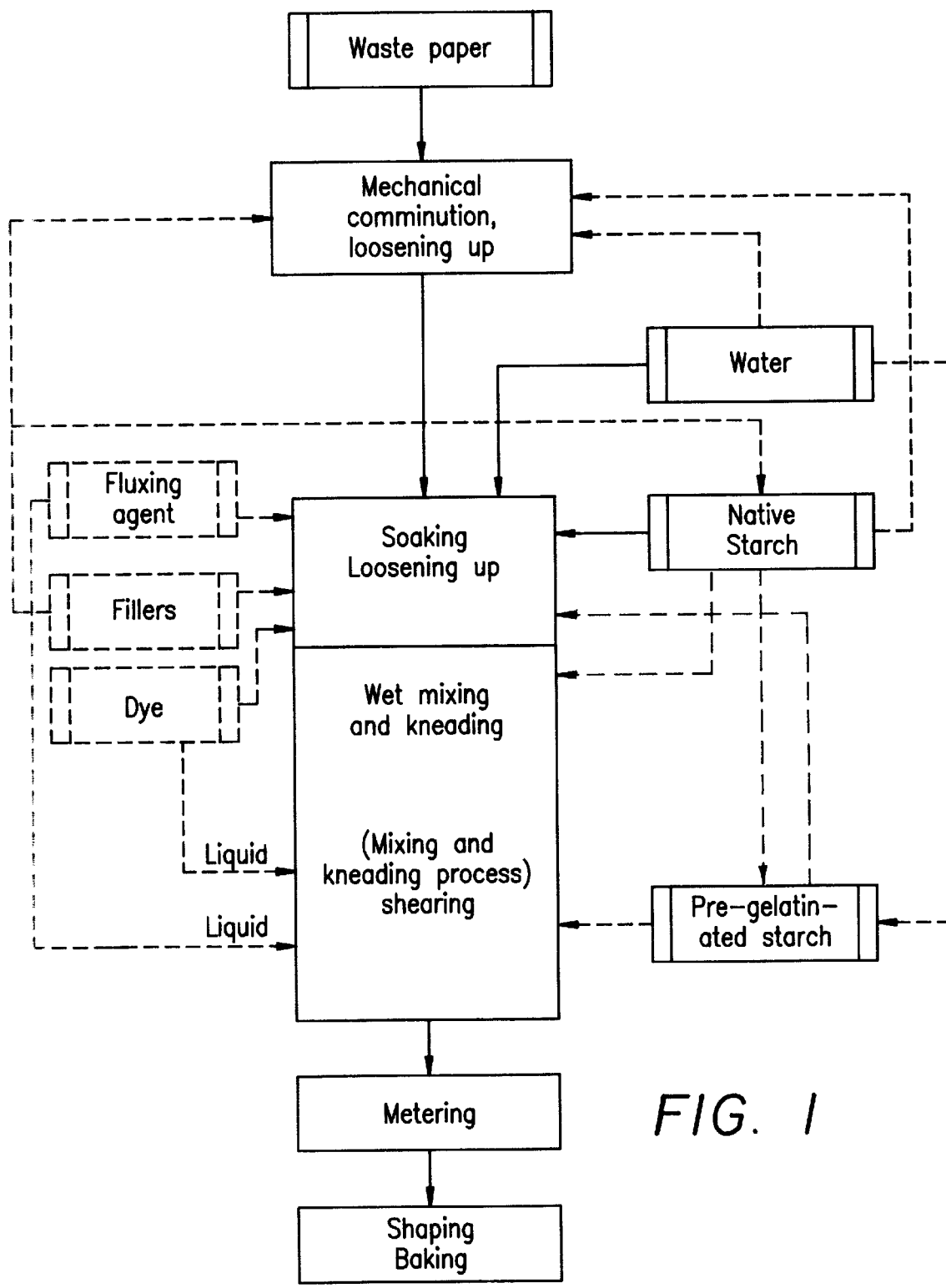

United States Patent [19]
Arnold et al.

[11] Patent Number: 5,849,152
[45] Date of Patent: Dec. 15, 1998

[54] PROCESS FOR THE PRODUCTION OF SHAPED BODIES FROM BIODEGRADABLE MATERIAL AND SHAPED BODY

[75] Inventors: Gerd Arnold; Hans Jürgen Steiger; Christian Gass, all of Dresden; Friedrich Wissmueller, Schwarzenbruck; Erhard Buettner, Radebeul; Wolfgang Melzer, Medingen; Brunhilde Schoenberg, Radebeul; Frank Dubbert, Reichenberg; Thomas Koeblitz, Varel, all of Germany

[73] Assignee: Rapido Waagen- und Maschinenfabrik GmbH, Germany

[21] Appl. No.: 669,488

[22] PCT Filed: Jan. 26, 1995

[86] PCT No.: PCT/EP95/00285

§ 371 Date: Nov. 7, 1996

§ 102(e) Date: Nov. 7, 1996

[87] PCT Pub. No.: WO95/20628

PCT Pub. Date: Aug. 3, 1995

[30] Foreign Application Priority Data

Jan. 27, 1994 [DE] Germany .......................... 44 02 284.0

[51] Int. Cl.⁶ .................................................. D21H 11/00
[52] U.S. Cl. .......................... 162/116; 162/147; 162/149; 162/175; 264/86; 264/115; 264/DIG. 69
[58] Field of Search ................................. 264/86, 87, 115, 264/122, DIG. 69; 162/116, 149, 147, 175

[56] References Cited

U.S. PATENT DOCUMENTS

| 4,377,440 | 3/1983 | Gasland | 162/101 |
| 4,508,595 | 4/1985 | Gasland | 162/147 |
| 5,582,682 | 12/1996 | Ferretti | 162/175 |

FOREIGN PATENT DOCUMENTS

| 4009408 | 9/1981 | Germany . |
| 3813984 | 11/1989 | Germany . |
| 4135330 | 3/1992 | Germany . |
| 6056172 | 7/1992 | Japan . |
| A632911 | 12/1994 | United Kingdom . |
| 9418384 | 8/1994 | WIPO . |

*Primary Examiner*—Mary Lynn Theisen
*Attorney, Agent, or Firm*—Lorusso & Loud

[57] ABSTRACT

The invention relates to a process for the production of shaped bodies, in particular packaging shaped bodies, from biologically decomposable material using a viscous mass containing biologically decomposable fiber material, water and starch, which is baked with the formation of a composite of fiber material and starch in a baking mould, and a shaped body produced according to this process. The use of native and pre-gelatinated or modified starch in connection with a fiber material feed stock from fibers or fiber bundles of differing lengths is especially advantageous.

45 Claims, 13 Drawing Sheets

FIG. 4

| | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ | $x_{13}$ | $x_{14}$ | $x_{15}$ |
|---|---|---|---|---|---|---|---|---|---|---|---|---|---|---|---|
| a | 18.7 | 28.2 | 37.3 | 47 | 56.4 | 65.8 | 75 | 84.3 | 93.3 | 102.9 | 112.3 | 122 | 131.4 | 140.8 | 150 |

$x_{1-15}$    Sample a in % by weight    native starch b = 250% by weight    water (based on the dry mass of the fiber material)

c = 100% by weight    fiber material

FIG. 5

|   | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ | $x_{13}$ | $x_{14}$ | $x_{15}$ |
|---|---|---|---|---|---|---|---|---|---|---|---|---|---|---|---|
| a | 18.7 | 28.2 | 37.3 | 47 | 56.4 | 65.8 | 75 | 84.3 | 93.3 | 102.9 | 112.3 | 122 | 131.4 | 140.8 | 150 |
| d | 6.3 | 9.4 | 12.7 | 15.7 | 18.8 | 21.9 | 25 | 28.3 | 31.3 | 34.9 | 37.7 | 40.7 | 43.8 | 46.9 | 50 |
| e | 24.9 | 37.8 | 50 | 62.7 | 75.2 | 87.7 | 100 | 112.7 | 124.7 | 137.8 | 150 | 162.7 | 175.2 | 187.7 | 200 |

$x_{1-15}$ Sample
a in % by weight   native starch
d in % by weight   pre-gelatinated starch
e in % by weight   total starch
b = 250% by weight   water (based on the dry mass of the fiber material)
c = 100% by weight   fiber material

| Classification | Length fiber/<br>fiber bundle [mm] |
|---|---|
| 1 | 0.96 – 1.44 |
| 2 | 1.92 – 2.40 |
| 3 | 2.40 – 2.88 |
| 4 | 0.72 – 2.16 |
| 5 | 3.06 – 3.57 |
| 6 | 2.55 – 4.59 |
| 7 | 0.24 – 1.68 |
| 8 | 0.24 – 4.32 |

Figure 6:
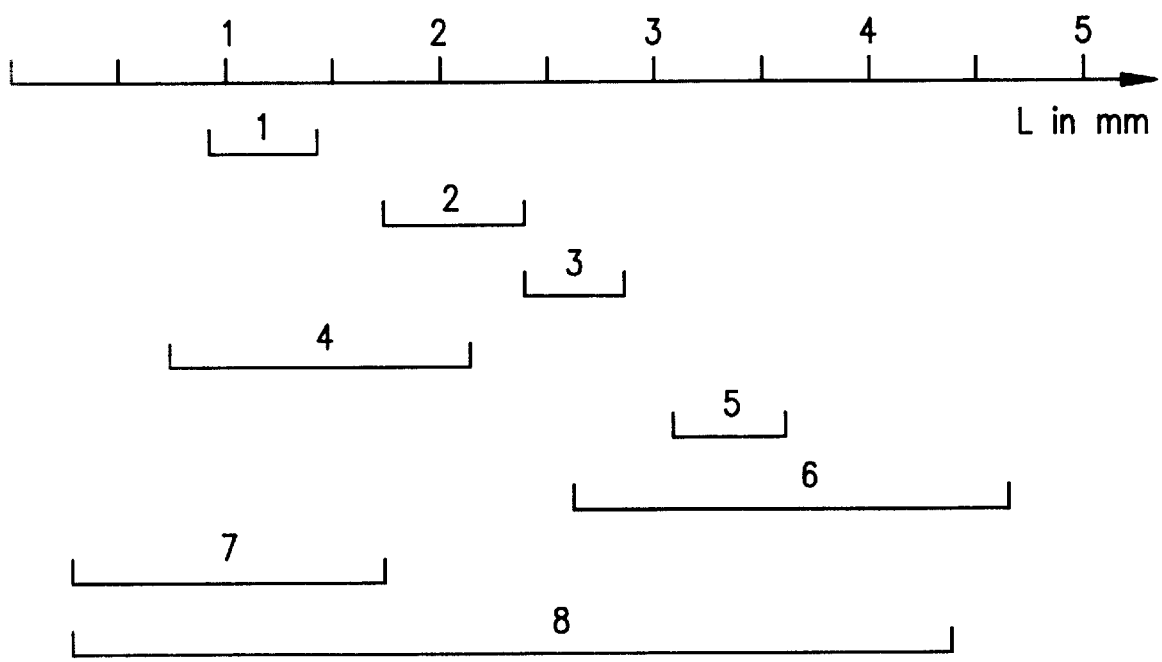

FIG. 8  Use of fibers (fiber bundles) classified according to fiber length according Fig. 6

| Mould depth | -30 mm | | | | | | | | -50 mm | | | | | | | |
|---|---|---|---|---|---|---|---|---|---|---|---|---|---|---|---|---|
| Fiber length | 1 | 2 | 3 | 4 | 5 | 6 | 7 | 8 | 1 | 2 | 3 | 4 | 5 | 6 | 7 | 8 |
| Surface/structure | + | + | + | + | + | − | + | − | + | + | + | + | + | + | + | − |
| Strength/stability | − | − | − | + | − | + | + | + | − | − | − | + | − | + | + | + |
| Elasticity/structure | − | − | − | + | − | + | + | + | − | − | − | + | − | + | + | + |

| Mould depth | -80 mm | | | | | | | | > 80 mm | | | | | | | |
|---|---|---|---|---|---|---|---|---|---|---|---|---|---|---|---|---|
| Fiber length | 1 | 2 | 3 | 4 | 5 | 6 | 7 | 8 | 1 | 2 | 3 | 4 | 5 | 6 | 7 | 8 |
| Surface/structure | + | − | − | + | + | + | + | + | + | − | − | + | + | + | + | + |
| Strength/stability | − | − | − | + | − | + | + | + | − | − | − | + | − | + | + | + |
| Elasticity/structure | − | − | − | + | − | + | + | + | − | − | − | + | − | + | + | + |

+ Shaped bodies complying with requirements
− Shaped bodies not complying with requirements Use of fiber mixtures of differing fiber lengths according to Fig. 6

| Mould depth | − 30 mm | | − 50 mm | | − 80 mm | | > 80 mm | |
|---|---|---|---|---|---|---|---|---|
| Combination of fiber lengths according to Fig. 6 | 7 + 4 | 4 + 2 | 7 + 2 + 3 | 4 + 2 + 3 | 7 + 2 + 3 + 5 | 8 | 7 + 2 + 6 | 8 + 6 |
| Surface/structure | − | + | − | + | − | + | − | + |
| Strength/stability | + | + | + | + | + | + | + | + |
| Elasticity/structure | − | + | + | + | + | + | + | + |
| Fiber material/starch | 60 : 40 | | 55 : 45 | | 50 : 50 | | 45 : 55 | |
| Starch/water | 0.4 : 1 | | 0.4 : 1 | | 0.4 : 1 | | 0.3 : 1 | |

+ Shaped bodies complying with requirements
− Shaped bodies not complying with requirements

FIG. 9

| In % by weight | x1 | x2 | x3 | x4 | x5 | x6 | x7 | x8 | x9 | x10 | x11 | x12 | x13 | x14 | x15 |
|---|---|---|---|---|---|---|---|---|---|---|---|---|---|---|---|
| Fibers materials to total mass | 26.7 | 25.8 | 25 | 24.2 | 23.5 | 22.8 | 22.2 | 21.6 | 21.1 | 20.5 | 20 | 19.5 | 19 | 18.6 | 18.2 |
| Total starch to total mass | 6.6 | 9.7 | 12.5 | 15.2 | 17.7 | 20.1 | 22.2 | 24.3 | 26.2 | 28.2 | 30 | 31.7 | 33.4 | 34.9 | 36.3 |
| Water to total mass | 66.7 | 64.5 | 62.5 | 60.6 | 58.8 | 57.1 | 55.6 | 54.1 | 52.7 | 51.3 | 50 | 48.8 | 47.6 | 46.5 | 45.5 |
| Pre-gelatinated starch to total mass | 1.6 | 2.4 | 3.2 | 3.8 | 4.4 | 5 | 5.5 | 6.1 | 6.6 | 7.1 | 7.5 | 7.9 | 8.4 | 8.7 | 9 | x1–15 Sample

FIG. 10

PROCESS FOR THE PRODUCTION OF SHAPED BODIES FROM BIODEGRADABLE MATERIAL AND SHAPED BODY

The invention relates to a process for the production of shaped bodies, in particular packaging shaped bodies, from biodegradable (biologically decomposable) material and a shaped body produced according to this process. This invention relates in particular to a process for the production of shaped bodies to be used as recyclable, biodegradable packages which contain biologically decomposable fiber material.

A large quantity of waste paper and cellulose fiber containing and starch containing scrap material accumulates in household and industry. For reasons of environmental production and the protection of natural resources recycled waste paper is also increasing by used as a starting material for paper production.

On the other hand, there is the urgent need, in particular in the field of packages, but also in other fields, to also use shaped bodies which only make demands on the waste industry to a small degree, which are disintegratabie (recyclable) for reuse and are e.g. substantially biodegradable (biologically decomposable) in non-residue fashion e.g. within the scope of composting. Consequently, waste paper and cellulose-fiber- and starch-containing scrap material such as wood dust or paper dust and also de-inked waste paper (de-inking material) also come into consideration as basic materials for the production of shaped bodies as packaging means. For the packaging of foodstuff, products produced from recycled waste paper are subjected to a special surface treatment in order to comply with hygiene requirements. If unsoiled waste paper from industrial processing is exclusively used, such a treatment can be omitted if legally stipulated basic production conditions are observed.

Consequently, flat trays or covers made of cardboard produced with the exclusive or partial use of waste paper are known. This cardboard is punched and shaped by means of corresponding dies. However, there are narrow limits to the obtainable abundance of shapes due to the nature of the material, since cardboard can only be shaped to a very limited extent.

To avoid this disadvantage, shaped packages are being increasingly produced according to the fiber casting process, which is based on the fundamentals of conventional paper production. Fiber suspensions of comminuted waste paper and water are prepared and placed on shaped sieves. Subsequently, water is extracted and the shaped article is dried; it can possibly also be subjected to a compressing pressing treatment. It is disadvantageous that the carrying out of this process as it is e.g. known from DE 40 35 887 is very expensive and has an impact on the environment due to the great water requirements. Quite recently, it was also attempted to replace shaped packages made from plastic material and particularly suited for the packaging of foodstuffs with products on the basis of waste paper.

The production of a multi-layer packaging tray for foodstuffs is e.g. known from DE-OS 39 23 497, whose carrier layer consists predominantly of recycling material on the basis of waste paper. A share of foamed plastic material is necessary here as a binding agent. The production of such packaging trays requires a relatively expensive, multi-stage process, in which comminuted waste paper material is guided via an extruder to a web-shaped carrier layer and subsequently is shaped to packaging trays together with a cover layer by means of deep drawing or pressing, respectively. During production, a controlled, metered addition of plastic granulates into the carrier layer as a binding agent must be effected. Due to the use of plastic material such as a packaging tray is detrimentally not comprised of completely decomposable, organic material. Moreover, the production is cost-intensive due to the expensive operation sequence.

Packages on the basis of waffle dough, both as edible packages and, as a function of the used additives, as non-edible packages are also known (EP 513 106). There are difficulties as regards longevity, elasticity, breaking strength and durability of such packages.

Finally, it is also known to produce shaped packaging material substantially on the basis of starch using modified starch with fusing of the starch and subsequent extrusion and cooling (EP 0 304 401 B1). However, the product properties of the packaging material obtained in this fashion are not completely satisfactory for many purposes due to the relatively low breaking strength of packages on the basis of starch.

Consequently, the invention is based on the object of indicating a process for producing shaped bodies from biodegradable material and such a shaped body, which can be carried out in a cost-efficient and simple fashion and results in a shaped body, in particular for packaging purposes, from completely rotting, biologically decomposable material, which excels by a high surface quality and little porosity, structural strength and elasticity.

As regards the process, this object is solved according to the invention by the fact that if a raw material containing biodegradable fibers, such as waste paper, is used, it is reduced to its fiber structure and levelled to a viscous mass with water and starch, which is transferred into a baking mould and baked with the formation of a composite of fiber material and starch.

According to the invention the shaped body, preferably produced according to the aforementioned process, in particular as a biodegradable packaging shaped body, consists of biologically decomposable fiber material, which is stabilized with starch to a composite of fiber material and starch and a residual share of water.

Depending on the used starting material, i.e., the fiber-containing raw material or the type of the biodegradable fibers which can also be used directly, and the intended use and depending on the shape of the packaging (mould depth during the baking process), a variable field of process parameters results both as regards the mixing rations of the feedstock water, biologically decomposable fiber material and starch and the used comminution levelling and baking technology.

According to a preferred embodiment of the process of the invention, it can be used with a relatively high share of fiber material, i.e. of waste paper and cellulose-fiber- and starch-containing scrap material or other sources of biologically decomposable fiber material such as beet slices, excellent product properties of the shaped bodies produced in this fashion as packaging materials being nevertheless achieved. The shaped bodies or the packaging material produced in this fashion are quickly biodegradable and can be recycled without great expenditure. The use of waste paper and cellulose-fiber- and starch-containing scrap material such as wood dust and paper dust, beet slices or the like results already in the case of a relatively low share of starch with final processing of the levelled, viscous mass in a final baking process step using the elements of waffle baking technology in a surprisingly high-quality shaped body in particular for packaging purposes, which is also extremely durable and nevertheless elastic, the production being at the same time cost-efficient and ecologically safe.

Preferred developments of the process of the invention and compositions of the shaped body are indicated in the subclaims.

The invention will be explained in the following in greater detail by means of examples of embodiments and pertinent drawings.

Figure 2:
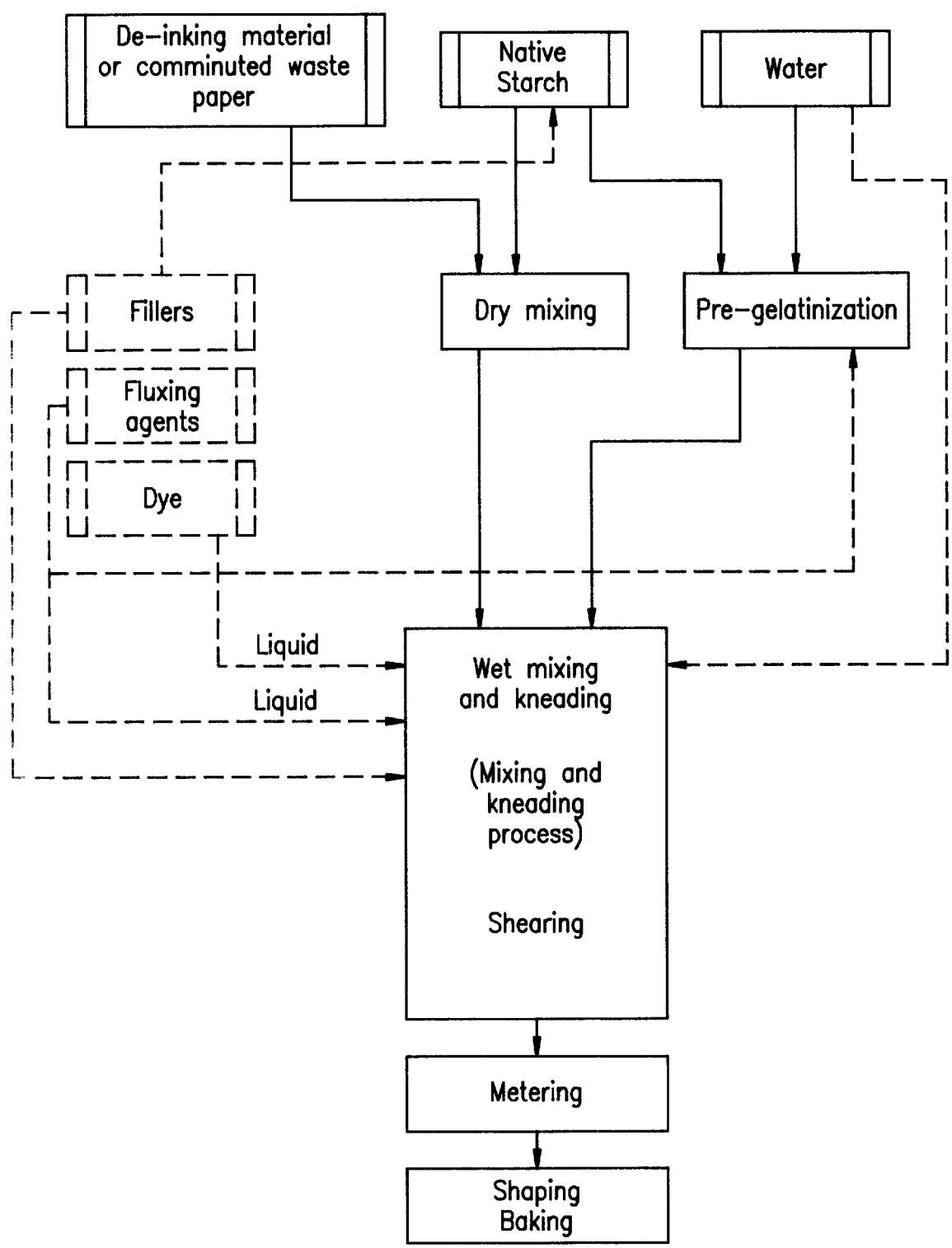
Figure 3:
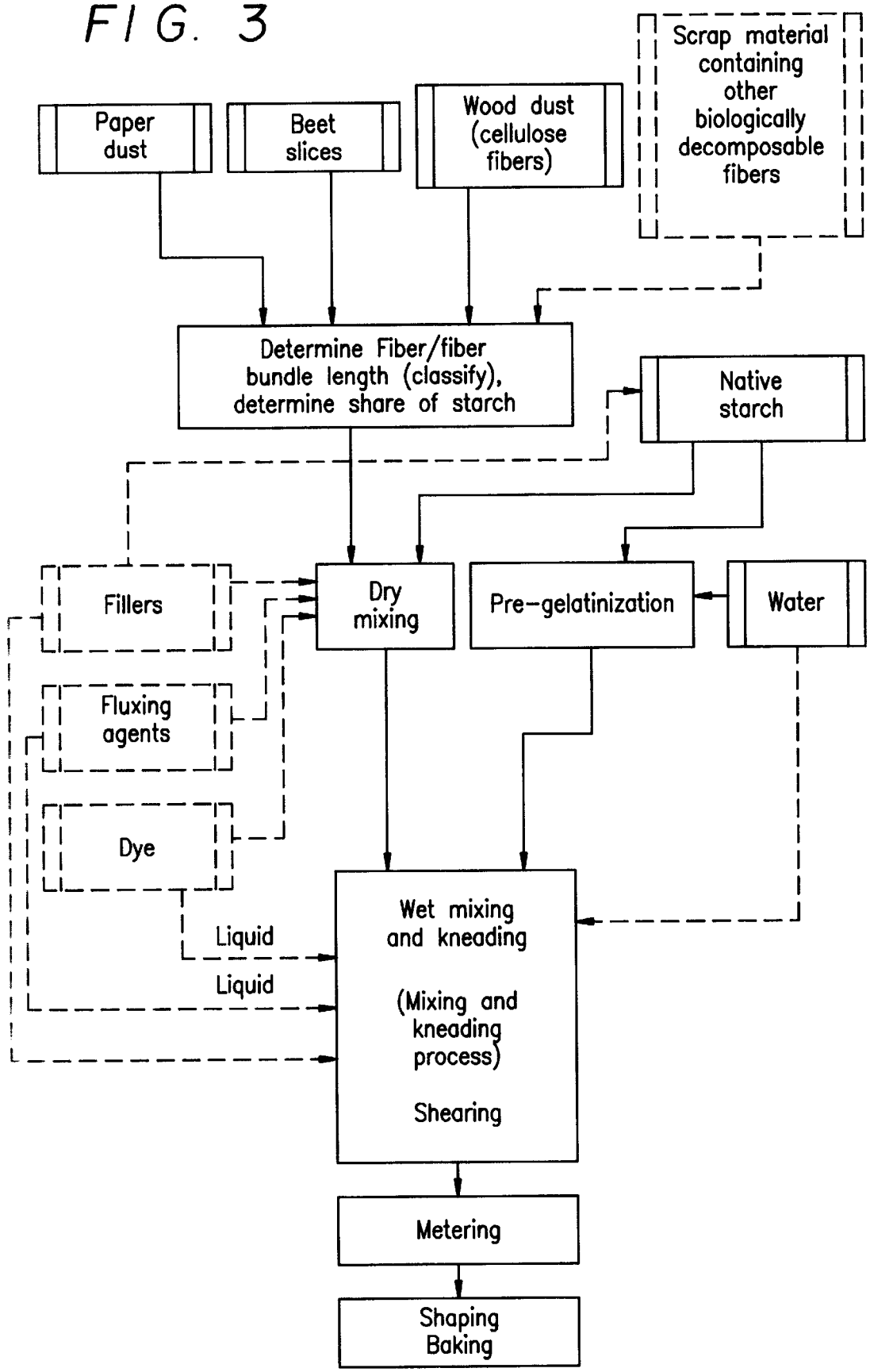
Figure 7:
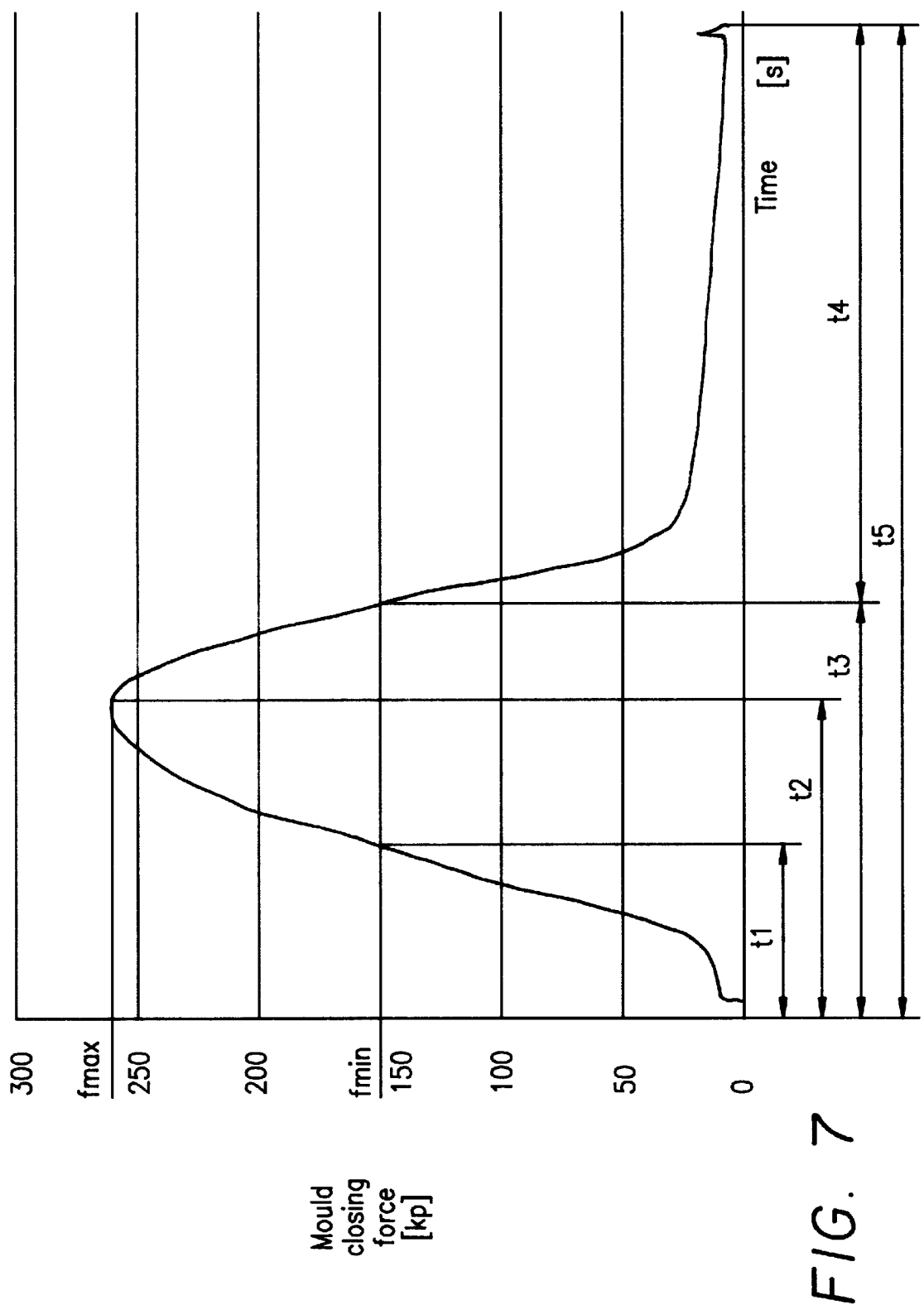

FIG. 1 shows a flow chart of the process for the production of shaped bodies on the basis of the use of waste paper as fiber-containing raw material, FIG. 2 shows a flow chart of a further example of embodiment for the production of shaped bodies on the basis of the use of already pre-comminuted, de-inked waste paper material (de-inking material), FIG. 3 shows a flow chart of a further example of embodiment of a process for the production of shaped bodies on the basis of the use of scrap material as fiber-containing raw material, such as paper dust, beet slices, wood pulp, etc., FIGS. 4 and 5 show a table for various samples with the differing use of native starch and pre-comminuted starch with a constant share of water, in each case based on the dry mass of the fiber material, FIG. 6 shows a table and a corresponding graphic representation of the classifications of the length of the used fiber material, FIG. 7 shows a pressure time diagram for a baking process for the production of a shaped body according to one of the aforementioned processes, FIG. 8 shows a table for the product evaluation of shaped bodies as a function of the mould depth of the used baking mould and as a function of classified fiber material, FIG. 9 shows a table for the product evaluation of shaped bodies as a function of the mould depth of the used baking mould and as a function of fiber material mixtures with different lengths of the fibers or fiber bundles, FIG. 10 shows a formulation table for the production of shaped bodies on the basis of waste paper as the fiber-containing raw material, and FIGS. 11 to 14 show various embodiments of shaped bodies produced according to examples of embodiment of the process according to the invention.

The term fiber material or fiber structure is used in the present application both for the disintegration to the individual fibers and for the disintegration to only relatively large fiber bundles of the fiber-containing raw materials.

FIG. 1 illustrates a first example of embodiment of the process for the production of packaging shaped bodies on the basis of waste paper.

The possibly additionally provided feedstocks (e.g. pre-gelatinated starch, fillers, fluxing agents, dye) or the addition of feedstocks in alternative process stages or combinatorily to the use possibilities represented in full lines are represented by broken lines in FIG. 1.

The waste paper in dry condition is comminuted in a first process step, this comminution preferably taking place carefully and in non-cutting fashion, but e.g. by means of shredders, choppers or free-beating mills such as pin mills or beater mills so that the paper fibers are substantially not cut, since this results in an substantially increased water absorption in the subsequent process by the then increased absorptivity of the cellulose fibers of the waste paper. The comminution process is to lead in tearing fashion to waste paper shreds in the magnitude of up to about 10 mm, preferably up to about 5 mm. For thick-walled and/or large-surface shaped bodies fibers or preferably loosened up fiber bundles with a fiber or fiber bundle length of up to 50 mm may be used to improve the inherent stability. For this application, as well, a mixture of longer fibers or fiber bundles in the range of about 10 mm to 50 mm with short fibers or fiber bundles in the range of 0.5 mm to 20 mm is preferably used.

If longer fiber bundles are used, the preparatory comminution expenditure is correspondingly reduced.

As in the remaining illustrated examples of embodiment, the preferred loosening up of the fiber bundles leads to a more intimate combination with the gelatinated starch which may penetrate into the hollow spaces of the shaped bundles so that the formation of a fiber/fiber bundle skeleton (fibers/fiber bundles "crosslinked" with each other), penetrated and superimposed by a starch matrix, is promoted and made possible, which results in an excellent inner bonding under the conditions of a baking process releasing steam under pressure.

The comminution process is preferably conducted in such fashion that a loosening up of the fiber bundles of the waste paper shreds affected by the comminution process takes place.

The waste paper carefully comminuted in this fashion and substantially torn is then defibrated in a mixing and kneading process for disintegrating its fiber structure with the addition of water and soaking and further loosening up and levelled to a viscous mass. As a function of the quality requirements to be met by the final shaped body, in particular packaging body, it is essential that the waste paper shreds are not disintegrated to their individual fibers as opposed to paper production, but the disintegration takes place by means of the mixing and kneading process to relatively large fiber bundles, because it became apparent that the strength of the final product (packaging shaped body) can be increased by this.

The mixing and kneading process, for which discontinuous or continuous kneaders or mixers are preferably used, is carried out in the presence of water, water being added in a ratio of up to 8:1, in some applications of about 7:1, based on the dry mass of the waste paper (here, the water absorption behaviour of the cellulose fiber is taken into consideration to an increased extent).

Since, on the other hand, it is advantageous to keep the share of water as small as possible as a function of the remaining components of the viscous mass and in particular as a function of the share of starch (for whose sufficient gelatinization the free water is substantially required) in order to be able to efficiently carry out the subsequent shaping process (baking), it became apparent that a share of water of 2:1 to 3:1, preferably of 2.5:1, based on the dry mass of the waste paper, is advantageous for many preferred applications. At the same time, native starch, e.g. native cereal starch, potato starch, maize starch or rice starch, is added to the mass. The mixing and kneading process for levelling this viscous mass is also carried out practically completely with shearing, i.e. with the use of the shearing forces between the mass particles or between the mass particles and a kneading or mixing element and thus by means of inner friction to preserve the fibers and thus to reduce the water absorption by the cellulose fibers, so that a careful disintegration of the waste paper shreds to their fiber structure takes place.

In this application, the term "fiber structure" includes both the disintegration to individual fibers and the disintegration to only relatively large, preferably loosened up fiber bundles of the starting material.

It is preferred in many cases that the disintegration is only carried out to the fiber bundles, since, due to this, a firm crosslinked structure and the formation of a composite of fiber bundle and starch is obtained in connection with the gelatinization of the starch.

Although the ratio of starch to fiber material in the viscous mass can vary within a broad range and depends in particular on the field of application and the quality requirements to be met by the finished shaped body, it is preferred, that, based on the dry weight of the used waste paper, the viscous mass contains 30% by weight to 50% by weight of starch.

However, the share of starch can also be substantially increased for especially smooth surfaces with high elasticity and due to the use of loosened up fiber bundles, which contribute to an increased extent to the structural strength.

The starch is preferably admixed as a native starch. Mixing ratios between native starch and fiber material (waste paper), based on the dry mass of the waste paper and observing a 2.5-fold water excess, based on this dry mass of the waste paper, are represented in FIG. 4.

The second process step of FIG. 1 (kneading and mixing process) for disintegrating the waste paper shreds to their fiber structure (preferably fiber bundles) can be subdivided into a pretreatment of the waste paper shreds for soaking the same with the addition of water and further loosening up; fluxing agents, in particular additives with alkaline effect, may also be optionally added during this process phase for improving the flow properties of the viscous mass during a subsequent baking process, and additives or dyes may also be optionally added.

Moreover, it is also possible to premix fillers with the native starch or parts thereof and to add them partly already during the preceding process step of dry comminution or to add them as a whole to the mixture during the formation of the viscous mass taking place in the presence of water and carrying out the mixing and kneading process for disintegrating the waste paper to its fiber structure.

As will be explained in the following in greater detail it is also possible in an especially advantageous operation sequence to use, in addition to the native starch, modified or pre-gelatinated starch in order to make available, on the one hand, an amount of water defined by the pre-gelatinated condition during a subsequent baking process or to achieve a complete gelatinization of the starch for forming a stable fiber starch composite even in the case of very short residence times of the mass in the subsequent baking process. The free addition of water can be limited in the case of the pre-gelatinated starch share, facultatively additionally used in the addition in FIG. 1.

Especially good results regarding surface quality, elasticity, structure and strength were achieved in the produced shaped bodies, if, in addition to a mixture of native and pre-gelatinated starch, a mixture of fiber material of differing fiber lengths, in particular using fiber bundles of differing lengths or fiber bundles in combination with individual fibers (in the case of the use of fiber-containing raw material such as waste paper of different degree of comminution) was used at the same time. Greater details will be explained in the following with reference to other examples of embodiment (cf. FIGS. 6 to 10).

Particularly chalk, kaolin, talcum, gypsum, clay, titania or alumina come into consideration as fillers. Alkaline additive such as magnesium carbonate, magnesium hydroxide carbonate, caustic soda solution and ammonium hydroxide are used as fluxing agents. The water, preferably with a share of 2.5 times the dry mass of the waste paper material is added in an amount which is necessary for achieving a viscous, flowing semifluid to highly viscous, plastic consistency of the mass and, on the other, required for gelatinating the starch in a subsequent baking process.

However, it can also be worked with a higher excess of water, e.g. of 7-fold, based on the dry mass of the waste paper, or 8-fold the amount of water, in particular, if, in addition to the native starch, no pre-gelatinated starch is used. During the thorough mixing and kneading of the viscous mass, the waste paper is, on the one hand, integrated to its fiber structure, here preferably to relatively large fiber bundles, and, on the other hand, these fiber bundles (or also individual fibers) are mixed with the starch in intimate and levelling fashion and an intimate combination between the soaked paper fiber structure and the starch is brought about.

Subsequently, after the levelling of the viscous mass, it is metered as regards the subsequent introduction into at least one baking mould and placed into the baking mould. The baking mould is formed by at least two baking plates, i.e. an upper and a lower baking plate (received in a pair of baking tongs), the inner surfaces of the baking plates being kept in spaced relationship in a closed, locked state of the baking mould forming a shaped hollow shape, and the shaped hollow space being filled by the viscous mass. A plurality of baking tongs can of course be used for the simultaneous production of a plurality of shaped bodies.

As already set forth, the viscosity of the mass can vary up to a plastic state. In the latter, preferred case of a described mass poor in water, the mass can e.g. be brought to the wall thickness of the final shaped body be approximately expected by means its being rolled out and subsequently punching of a blank is carried out taking the dimensional geometry into consideration. Subsequently, these preshaped blanks can be successively placed into the baking mould.

In a further embodiment of the process, it is also possible to introduce a metered amount of the viscous mass into the baking mould between the baking plate and to achieve a deformation by lowering the upper baking tong of the baking mould itself or by means of a separate die.

In the case of masses with a low viscosity, which are added to the baking mould in flowable condition, the baking mould is well filled between the upper and the lower baking plate. Due to the relatively high share of water, the duration of the baking process is, however, prolonged partly detrimentally or a shaped body which is too fluffy is produced due to the high steam pressure in the baking mould during the baking process.

These difficulties can be countered by reducing the free water of the viscous mass (inasmuch as it is not required for the gelatinization of the native starch during the baking process) prior to the introduction of the mass into the baking mould. To achieve this, the viscous mass can be introduced into a shaped sieve corresponding at least approximatively to the contour of the baking mould, i.e. the shaped hollow space between upper and lower baking tongs, and loaded by means of an adequate counterpart. This process can still be sped up, if this "pressing" is effected under vacuum.

In this case, the preshaped mass blank can then be removed from the shaped sieve and introduced into the shaped hollow space of the baking mould.

This can possibly still be followed by an evaporation process, before the baking begins. Such an evaporation process can be carried out by not immediately closing and locking the baking mould at the beginning of the baking process leaving a constant spacing between the inner surfaces of upper and lower baking plates which determines the wall thickness of the finished shaped body, but by placing the upper baking plate for a short duration of time only loosely so that, due to the temperature of the preheated baking mould, in particular the upper baking plate, the water content (excess water) of the blank or of the viscous composition located in the baking mould can be reduced before the actual baking process starts so that a reduction of the baking time can also be brought about in this fashion and the product properties can be improved.

The feedstock of native starch with constantly kept amount of water (2.5-times), based in each case on the dry mass of the waste paper fiber material (fiber bundle), is represented in FIG. 4 for 15 samples.

As regards the preferred use of a mixture of native and pre-gelatinated starch the table according to FIG. 5 indicates the preferred ratios of the use of native and pre-gelatinated starch. A ratio between native and pregelatinated starch of about 3:1 proved to be advantageous.

Moreover, advantageous properties were observed in the shaped bodies produced according to the invention if the share of starch to water in the viscous mass was about 1:10 to 1:1, preferably 1:3 to 1:2.

The baking process which, in its technology, returns to the basic elements of waffle baking technology, begins with the closing and locking of the baking mould leaving the shaped hollow space filled with mass between the upper baking plate and the lower baking plate. This distance, which is kept constant during the baking process by means of the locking of the upper and lower baking plates, determines the wall thickness of the finished shaped body.

The baking process whose chronological run is represented in a pressure/time diagram in FIG. 7, is carried out at a temperature ranging from 105° C. to 300° C., preferably from 150° C. to 200° C., especially advantageous results regarding the thorough baking of the shaped body and the shaped body geometry being achieved in many cases with a baking temperature of about 180° C. The duration of baking depends on various parameters, particularly the viscosity of the mass (water content), the share of starch (the duration must make the complete and continuous gelatinization of the native starch even in cooperation with the possibly used, modified or pre-gelatinated starch possible), the geometry of the shaped body and the concrete mass components. In general, the baking duration can vary between 0.5 and 15 minutes, shorter cycle times in the range of 1 to 3 minutes being in general sufficient and resulting in dimensionally accurate shaped bodies with a high, smooth surface quality, high elasticity and structural strength due to the formed composite of fiber or fiber bundle and starch, a fiber-reinforced starch matrix.

In other cases, in particular in the case of a higher share of water, a baking duration between 4 and 12 minutes also led to good results, a baking duration being as short as possible being advantageous for increasing the efficiency of the operation sequence without the uniform inner structure design of the fiber bundle starch matrix being impaired.

The mould closing force of the baking mould over time is plotted in FIG. 7, the increase in pressure during the represented baking process being attributable to the increase in pressure due to the evaporation of the water in the mass. It is essential for a complete formation of the shaped body that a minimum force of about 150 kp, detected at the closing bolt of the baking mould and representing the inner pressure of the mould due to water evaporation, is exceeded, and that, on the other hand, the maximum inner pressure represented by the force occurring as a maximum at the closing bolt, here about 256 kp, is not essentially exceeded or does not excessively increase.

In FIG. 7 $t_1$ designates the time from the closing of the baking mould until the reaching of a value of the mould closing force $f_{min}$, which represents the minimum evaporation pressure in the baking mould, $t_2$ designates the time from the closing of the baking mould until the reaching of a value of the mould closing force $f_{max}$, which represents a maximum evaporation pressure within the baking mould, $t_3$ designates the time from the closing of the baking mould until the termination of the steam discharge, $t_4$ designates the baking time or drying of the baked shaped body and $t_5$ designates the entire duration of baking from the closing of the baking mould until the opening of the baking mould. In the present case a good quality and shapability of the shaped body is achieved with a closing force difference $f_{max}$-$f_{min}$ of about 100 kp, $t_5$ representing the preferred baking duration in the range of 1 to 3 minutes.

Thus, the difference $t_3$-$t_1$ relates to the baking process and the shaping with discharge of steam. During the baking process, the native starch is gelatinated (possibly also with water absorption from a pre-gelatinated share of starch) and is solidified. The starch is stored in the loosened up fiber bundle structures of the waste paper and produces a stable bonding of the loosened up fiber structure with the starch matrix being forming due to the gelatinization.

If only native starch is used, such shaped bodies already comply with a plurality of application cases as regards elasticity and surface quality. Whereas a high share of starch leads to a better surface with certainly reduced elasticity, the elasticity of the shaped body can customarily only be reduced by a reduction of the share of the starch at the expense of a smooth surface. However, due to the process according to the invention it is possible to achieve a substantial improvement of the elasticity simultaneously ensuring a high surface quality due to the fact that, in addition to native starch, modified or pre-gelatinated starch is used. The special effectiveness of the use of a mixture of pre-gelatinated and native starch is attributed to the fact that due to the high absorptivity of the waste paper no sufficient free water or baking duration is available in the baking process for the gelatinization of the native starch. Consequently, the introduced native starch does not gelatinize completely in many cases in conventional products and brings about a broad range of values of elasticity of the thus obtained shaped bodies.

According to the invention shaped bodies substantially exceeding conventional shaped bodies on the basis of starch as regards their properties can be achieved by the fact that a part of the starch is pre-gelatinated with water and the pre-gelatinated starch is added to the viscous mass, the shares resulting, as already explained above, from a test series of FIGS. 4 and 5 (share of total starch). The shares of native starch, pre-gelatinated starch and water relate in each case to the dry mass of the waste paper.

In the process of the invention it proved to be especially advantageous, in addition to the use of native and modified or pre-gelatinated starch, as regards surface quality, elasticity, structure and strength of the finished shaped bodies, if fiber material of differing lengths, in particular fiber bundles of differing lengths or mixtures of longer fiber bundles with shorter individual fibres, is used. The fiber length is preferably selected in the range between 0,5 and 5 mm for thin-walled shaped bodies, an overview of the fiber fractions (classification) being given in FIG. 6.

In a modification of the process according to FIG. 1 it is also possible not to carry out the comminution of the waste paper, possibly with the addition of native starch and fillers in dry condition, but to already carry out the mechanical comminution in the presence of water in a corresponding comminution mixer.

As regards the use of a share of pre-gelatinated starch, a modified starch harmonized with the baking technology can also be used.

A further example of embodiment of the process of the invention is explained in the following by means of FIG. 2.

Here de-inking material, i.e. de-inked waste paper which is already in the form of powder or small shreds is used as a starting material (fiber-containing raw material containing biologically decomposable fibers, in particular material of vegetable origin containing cellulose fibers), although this process (using a comminution step) can also be carried out with waste paper as a raw material as in the process according to FIG. 1 or with another fiber material containing biologically decomposable fibers.

In this process the already sufficiently comminuted de-inking material is premixed in dry or moist condition with a share of native starch, possibly as in the process according to FIG. 1 with the addition of fillers (which can also be added as a premix together with the native starch), and possibly with the addition of fluxing agents of the aforementioned type and/or dyes, whereas another share of the native starch is pre-gelatinated with water. The dry premixture permits a high degree of levelling and homogenizing of the mass and is followed by a further process step of the mixing and kneading process in the presence of water for disintegrating the de-inking material to its fibre structure, i.e. preferably to loosened up fiber bundles, for the formation of a levelled, viscous mass, to which additionally the share of pre-gelatinated starch is added taking into consideration the mixing ratios of water, fiber material, native and pre-gelatinated starch indicated in connection with the process according to FIG. 1 and FIGS. 4 and 5.

If required, fluxing agents can also be added to the mixing and kneading process taking place in the presence of water as this also applies to the addition of filler or the addition of dye suspensions. In this case, as well, a non-cutting disintegration of the de-inking material to its fiber structure, which is as careful as possible, in particular with the formation of relatively large, loosened up fiber bundles is brought about, it being possible to achieve still improved shaped body properties by the targeted use of classified materials, i.e. of fiber bundle mixtures of differing fiber lengths.

The dry mixing of the components waste paper and/or de-inking material (or also other cellulose- and starch-containing scrap material as fiber-containing raw material, cf. process according to FIG. 3) with starch results in an improvement of the surface quality of the shaped body.

The other process steps of metering and the baking process (possibly with preceding shaping) correspond to the final process steps for the baking production of the shaped bodies, in particular for packaging purposes, which was already explained by means of FIG. 1.

As already explained in connection with the process according to FIG. 1, the elasticity of the thoroughly baked shaped body is decisively determined by the use of a mixture of pre-gelatinated starch and native starch, in particular by the pre-gelatinated share. Reference is made to FIGS. 4 and 5 as regards the quantitative ratios which proved to be advantageous.

The steam pressure explained by means of FIG. 7, which prevails in the baking mould during the baking process (represented by the mould closing force of the baking mould), also determines the surface of the shaped body. This steam depends on the share of native starch and the moisture of the viscous mass.

The steam in the baking mould can be controlled in the desired fashion by controlling the steam outlet ducts in the baking mould as regards their cross-section and position and by means of the use of control valves.

If required, the additional addition of water to the mixing and kneading process for the production of the viscous mass (represented in dashed fashion in FIG. 2) can be completely renounced, so that the moisture of the mass and thus also the share of water for gelatinization the native starch is determined by the share of water of the used, pre-gelatinated starch. In this fashion, the steam pressure conditions during the baking process and thus the surface quality of the shaped bodies can be controlled. The native starch is preferably added to the dry mass during the mixing process with the other components, but can also be introduced at least partly directly into the mixing and kneading process causing the fiber bundle disintegration and levelling the viscous mass (also represented in dashed lines in FIG. 2). These other components are in the present case dry, comminuted waste paper and/or de-inking material, alternatively additionally fluxing agents and/or fillers.

The structure and thus also the strength of the shaped bodies is essentially determined by the ratio of starch to waste paper or de-inking material and also by the length of the used fiber bundles or fibers which have an essential influence on the differing strengths as is shown by examinations of comparative samples which are represented in FIGS. 8 and 9.

It became in particular apparent that the use of fiber-containing material with biologically decomposable fibers of differing fiber lengths, i.e. fiber bundles or fiber mixtures with different fiber lengths ranging from 0.5 mm to about 10 mm, preferably ranging from 1 mm to 5 mm, particularly for thin-walled shaped bodies, result in very advantageous results as regards the strength taking different shaped body geometries and mould depths of the baking mould into consideration.

It became apparent that, due to a mixture of short and long fibers or short and long fiber bundles or also due to a mixture of long fiber bundles and short fibers in conmbination with the use of starch being modified or pre-gelatinated as regards the baking process and native starch, the strength of the shaped bodies can be increased to a surprisingly great extent (cf. FIG. 9).

In was found in general that in the case of a high share of native starch as compared with pre-gelatinated or modified starch a good surface, but only a relatively low elasticity of the shaped bodies can be achieved, whereas a very high share of pre-gelatinated or modified starch as compared to native starch leads to a good elasticity, but a poorer surface of the shaped body.

As regards the respective application and the shaped body geometry the ratio of native to pre-gelatinated starch (preferably 3:1) must consequently be adjusted taking the fiber lengths of the fiber-containing material or of the mixture of differently long fibers or fiber bundles into consideration, especially advantageous ratios being obtained in view of a relatively short baking process of between 0.5 and 3 minutes at about 150° C. to 200° C. in shaped bodies, whose composition is represented in FIG. 10.

A further example of embodiment of the process according to the invention is represented in FIG. 3, cellulose fibers, paper dust, beet slices and wood dust (cellulose fibers) being selected here as a starting material as exemplary representatives of scrap material, scrap material containing other biologically decomposable fibers, in particular on the basis of cellulose, being usable.

Biologically decomposable fiber structures which are in each case already disintegrated directly, in particular fiber bundles with a length of between 0.5 mm and about 50 mm (higher values for large-surface and/or thick-walled packaging shaped bodies), preferably between 1 mm and 5 mm (in particular for thin-walled, light-weight packaging shaped bodies), can of course be used in the process of the invention.

FIG. 3 illustrates that the process can also be carried out using mixed raw materials from the paper, foodstuff or fodder industry or various recycling substances from waste paper, these materials being already sufficiently comminuted in FIG. 3, in particular using shredders, choppers or free-beating mills such as pin mills or beater mills, i.e., with tearing and non-cutting processing, to preserve the fibers (and to reduce the water absorption of cellulose fibers), the comminuted raw material being classified first of all in a further process step as regards the present fiber length and its share of starch to adjust the respectively further components (addition of native and pre-gelatinated starch or selection of the mixing ratio of long and short fibers or fiber bundles).

The remaining process steps with preferred dry mixing of fiber-containing raw material and native starch and possibly fluxing agents and/or fillers (inasmuch as they are present in dry condition) correspond to those already explained by means of the process according to FIGS. 1 and 2. Although a dry pre-mixing between comminution and plastification to a viscous mass is preferred, the combination of the feedstock to a viscous mass can also be carried out directly in the mixing and kneading process, possibly in the presence of water.

However, it became apparent that especially advantageous results are obtained if the mixing and kneading process is carried out without the addition of water, only with the addition of moisture due to the starch pre-gelatinated with water excess, this resulting, as a consequence, in a highly viscous, doughy mass. During the baking process, both starch-inherent water and the water excess resulting from the pre-gelatinated starch is available for gelatinizing the native starch. Shaped bodies of especially advantageous quality as regards surface, structure, elasticity, strength and stability as regards the mould depth of the baking mould or the depth of the shaped body are obtained with the parameters represented in FIG. 10, the elasticity and the structure being substantially also determined by the use of pre-gelatinated starch. The surface and the structure are also substantially determined by the evaporation conditions during the baking process, i.e. by the share of moisture of the viscous mass, which is to be as low as possible, it being sufficient in many cases for the preparation of the mass to restrict the moistening to the indirect addition of water in the form of the admixture of the water excess of pre-gelatinated starch. This moisture is sufficient to bring about the complete gelatinization of the native starch.

The length of the used, loosened fiber bundles, possibly also in connection with individual fibers, is of essential influence; the used fibers determines substantially also the flow behaviour of the mass in the baking mould and must be selected taking the geometry of the shaped body, in particular the depth of the shaped body, into consideration. The use of short and long fibers in mixture (long and short fiber bundles) proved in many cases to be superior to the use of classified fibers of relatively determined length in the range between 0,5 mm and 5 mm as is shown by a comparison of FIGS. 8 and 9. However, longer fibers/fiber bundles up to a length of about 10 mm can also be used as a function of the requirements to be met by the shaped body, this also reducing the requirements to be met by the comminution process of e.g. the waste paper, which is connected upstream. Although this is not represented in the process according to FIGS. 1 and 2, a classification of the fiber material according to the length of the fibers/fiber bundles or as regards a starch content can also be carried out for evaluating the starting material, if mixtures of fibers and fiber bundles with different lengths are used.

In the case of the use of e.g. moist de-inking material, the process step "dry mixing" in the process according to FIGS. 2 and 3 can also be carried out in a moist condition, possibly also with the addition of a small amount of water.

Moreover, it may be advantageous to still push viscous mass into the already closed mould at the beginning of the baking process in order to also improve the mould filling behaviour in the case of a doughy mass and to work possibly with not rigidly locked mould halves, but with a slight pressing of the upper baking plate against the lower baking plate during the baking process. However, in general it proved to be sufficient to maintain the baking technology with rigidly locked baking plates (constant distance=wall thickness of the shaped body during the baking process).

If required, he baking process according to the process represented in FIGS. 1 to 3 can be followed by a conditioning of the obtained shaped bodies removed from the baking mould.

A comparison of FIGS. 8 and 9 illustrates again the advantages of the use of fiber mixtures with differing fiber lengths as opposed to the use of cellulose fibers or fiber bundles which only have a specific fiber length or a fiber length in a narrow range.

Preferred formulations for carrying out the process of the invention are represented in FIG. 10. It follows from this, that shaped bodies with a very great mould depth, with good strength, elasticity, structure and surface structure could be produced according the process of the invention, if the addition of fiber material, in particular loosened up fiber bundles, to the total mass of the viscous mass was 15 to 30% by weight, the share of the total starch (native plus pre-gelatinated starch) to the total mass of the viscous mass was about 40 to 5% by weight, the share of water in the total mass of the viscous mass was about 45 to 70% by weight and the share of pre-gelatinated starch in the total mass of the viscous mass was about 10 to 1%.

Figure 11:
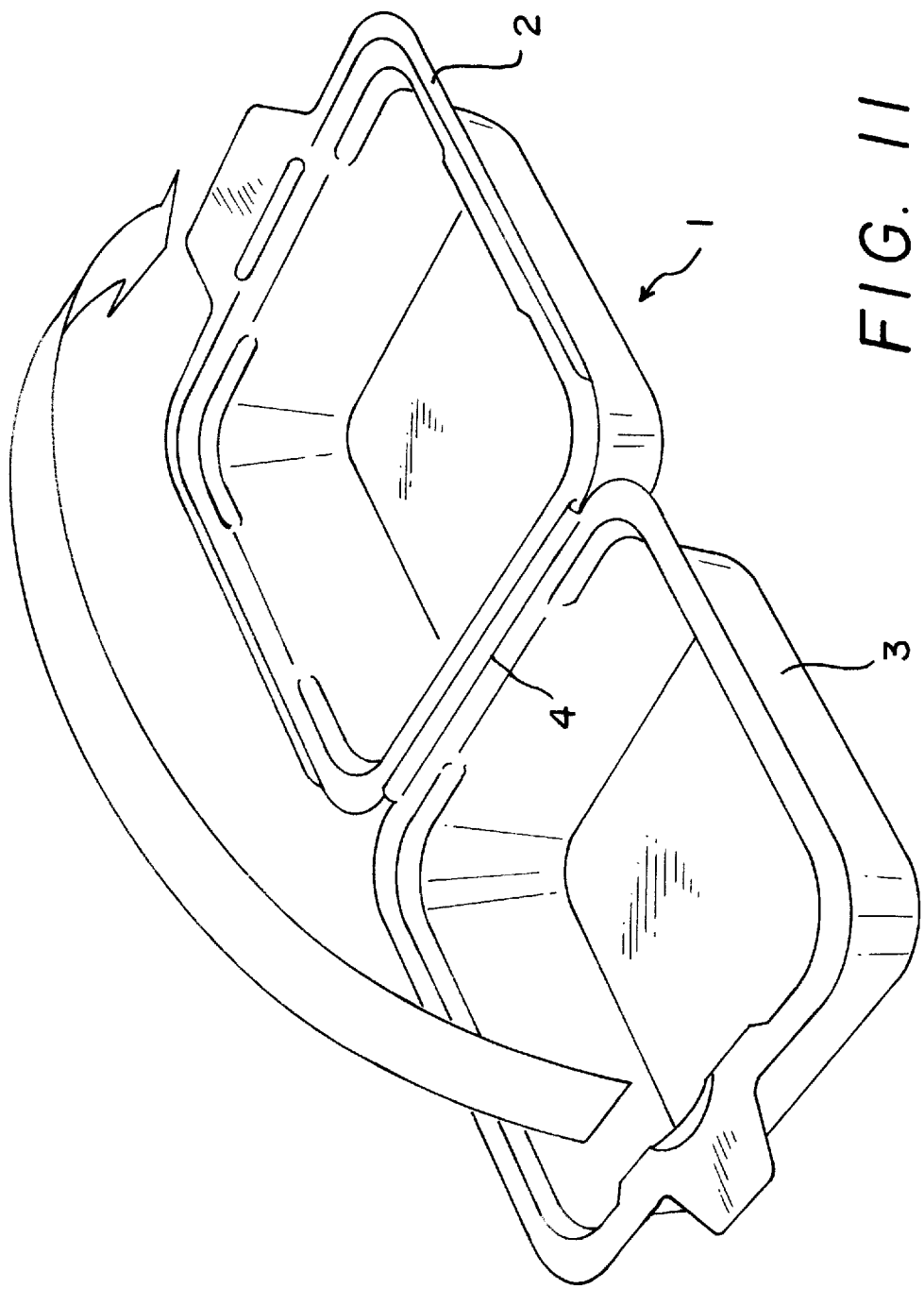

Examples of embodiment of shaped bodies produced according to the process of the invention are represented in FIGS. 11 to 14. FIG. 11 shows a packaging shaped body 1 with bottom and cover part 2, 3, which are connected by means of a hinge 4, said packaging shaped body being e.g. suited for the closable receiving of foodstuffs also in warm condition.

Figure 12:
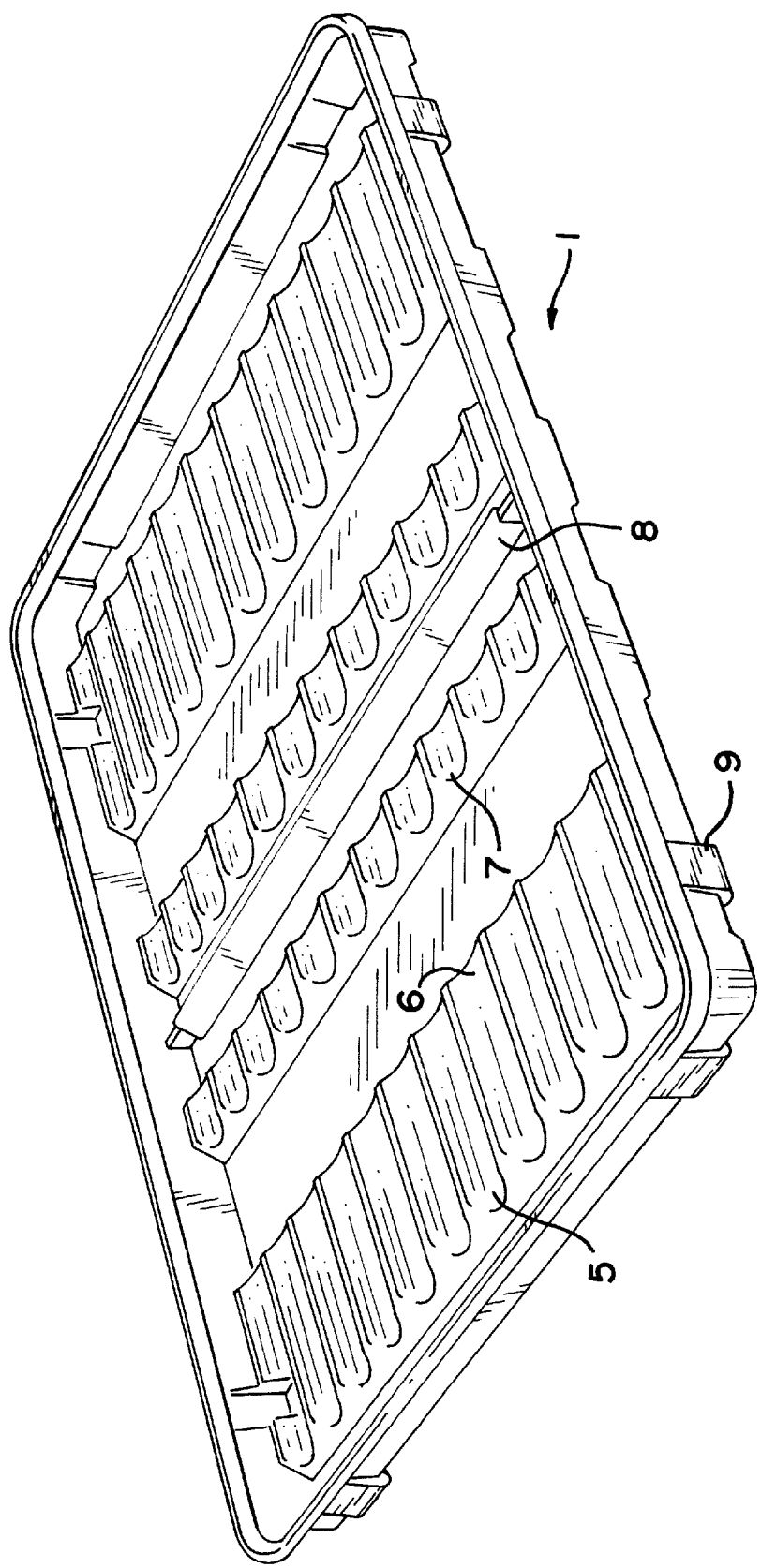

FIG. 12 shows a shaped body (semitray) which can also be connected with a corresponding shaped counter-body to a complete closed packaging. The tray-shaped shaped body 1 has a plurality of recesses 5 in the form of cylindrical sections, the same being subdivided into a longer section 6 and a shorter section 7 and this arrangement being repeated symmetrically and divided by a central web 8 on the other side of the shaped body. Lateral "legs" 9 increase the dimensional stability and improve the support and stackability of the packaging shaped body. Such a packing tray can e.g. be used for receiving ball pens, lipsticks, cosmetic articles, pencils, writing utensils or, also in the pharmaceutical industry, e.g. for receiving small packaging tubes.

Figure 13:
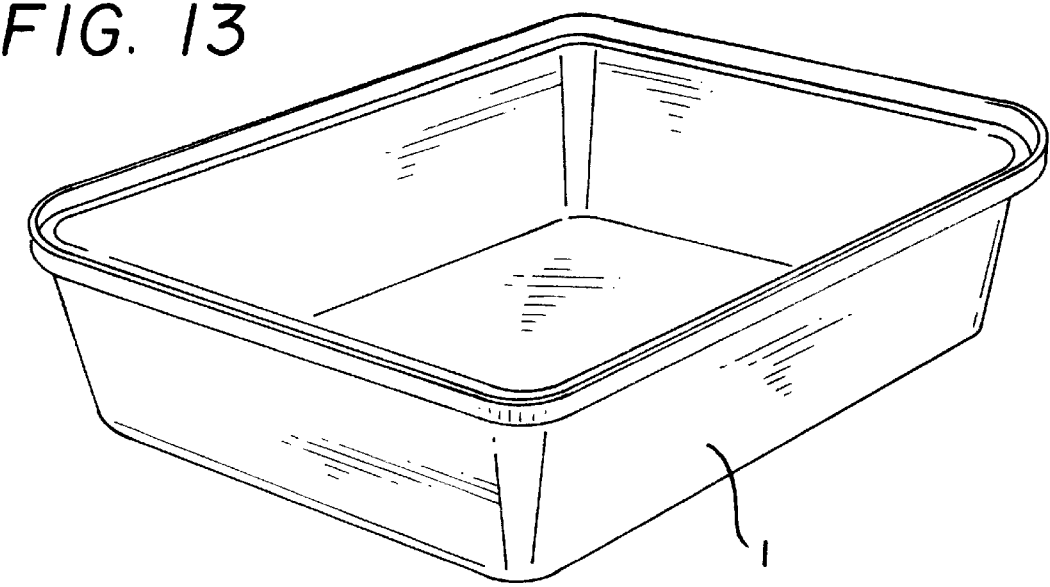
Figure 14:
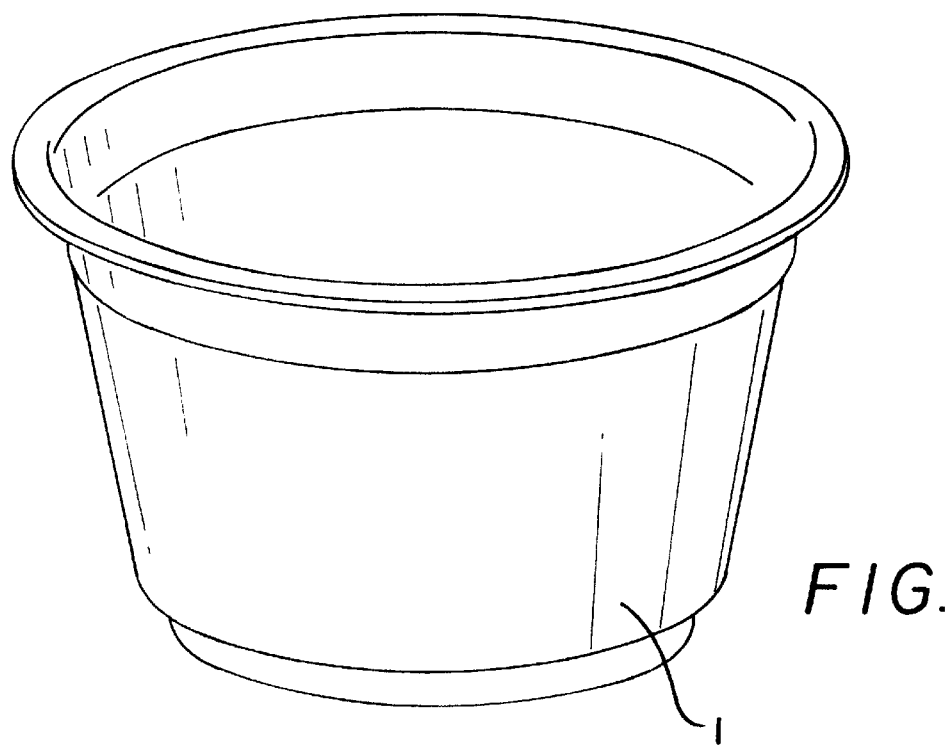

FIGS. 13 and 14 show relatively deep packing bodies 1 as they can be used e.g. as flower-pots, seed trays or for other packaging or wrapping purposes.

All packaging shaped bodies 1 produced according to the process explained above can be produced rapidly, in cost-efficient fashion and with excellent material properties as regards dimensional stability, breaking strength and elasticity, structure density and surface quality.

We claim:

1. A process for the production of a shaped body of a biodegradable material comprising:
   providing a viscous mass containing a biodegradable fiber material, water and 15 wt % to 200 wt % starch based on the dry weight of said fiber material;
   placing the viscous mass in a baking mold and then closing the baking mold; and
   heating the viscous mass within the baking mold at a baking temperature between 105° C. and 300° C. for a period of between 0.5 and 15 minutes, under increasing pressure due to evaporation of the water within the baking mold, to produce the shaped body.

2. The process of claim 1 further comprising comminuting a fibrous raw material to defibrate the fibrous raw material, and to thereby form the biodegradable fiber material, prior to incorporation into the viscous mass.

3. The process of claim 2 wherein said fibrous raw material is selected from the group consisting of waste paper, wood dust, paper dust, and beet slices.

4. The process of claim 2 wherein said comminuting is carried out only to the extent of reducing the fibrous raw materials to fiber bundles.

5. The process of claim 1 wherein said biodegradable fiber material is a mixture of fibers or fiber bundles having different lengths within the range of 0.5 mm to 50 mm.

6. The process of claim 1 wherein said starch is native starch.

7. The process of claim 1 wherein said starch is 30–50 wt % of said viscous mass.

8. The process of claim 1 wherein the ratio of water to said fiber material, on a dry weight basis, is up to about 8:1.

9. The process of claim 1 wherein said starch is a pre-gelatinated or modified starch in an amount up to about 30% by weight of said viscous mass.

10. The process of claim 1 wherein said starch is present in said viscous mass in an amount providing a ratio of said starch to said water in a range of about 1:10 to 1:1 and further comprising:
    adding said water in the form of a modified starch or a pre-gelatinated starch, with excess water, to said fiber material, to provide the viscous mass.

11. The process of claim 1 wherein said fiber material is 15 wt % to 30 wt % of the viscous mass, said starch is 5 wt % to 40 wt % of the viscous mass and said water is 70 wt % to 40 wt % of the viscous mass.

12. The process of claim 1 wherein said starch is a pre-gelatinated or modified starch and is present in the amount of 1–10% by weight of said viscous mass.

13. The process of claim 1 further comprising:
    comminuting a fibrous raw material; and then
    reducing the fiber structure of the comminuted fibrous raw material in the presence of said water and said starch to produce said biodegradable fiber material and to provide said viscous mass.

14. The process of claim 1 further comprising:
    comminuting a fibrous raw material in the presence of water; and subsequently reducing the comminuted fibrous raw material to its fiber structure and adding native starch to provide said viscous mass.

15. The process of claim 13 wherein said reducing is by mixing and kneading to generate internal shearing forces and to thereby produce fibers or loosened fiber bundles from said fibrous raw material.

16. The process of claim 1 wherein said biodegradable fiber material is a mixture of short and long fibers or fiber bundles of a length ranging from 0.5 mm to 5 mm.

17. The process of claim 1 further comprising classifying a fibrous raw material to provide plural fractions of different fiber length and utilizing one or more of said fractions as said biodegradable fiber material.

18. The process of claim 13 wherein said starch is native starch and is added at least in part during said comminuting, as a pre-mix with fillers.

19. The process of claim 13 wherein said starch is pre-gelatinated starch and is added at least in part during said comminuting, as a pre-mix with fillers.

20. The process of claim 15 wherein said starch is native starch in admixture with a filler and is added prior to said comminuting or subsequent to said comminuting and prior to said mixing and kneading.

21. The process of claim 15 wherein said starch is pre-gelatinated starch and is added during the mixing and kneading to form the viscous mass.

22. The process of claim 14 wherein said starch is native starch and is added at least in part during said comminuting, as a pre-mix with fillers.

23. The process of claim 13 wherein said comminuting is by means of beater mills.

24. The process of claim 14 wherein said comminuting is by means of beater mills.

25. The process of claim 14 wherein said starch is pre-gelatinated starch and is added at least in part during said comminuting, as a pre-mix with fillers.

26. The process of claim 1 further comprising adding an alkaline substance to said viscous material as a fluxing agent.

27. The process of claim 1 further comprising:
    converting said viscous mass into a doughy state;
    rolling said viscous mass in said doughy state to form a sheet of a thickness approximating wall thickness of the shaped body;
    punching blanks out of the rolled sheet; and
    placing one of said blanks in the baking mold.

28. The process of claim 1 wherein the baking mold includes upper and lower baking plates and further comprising:
    pre-shaping said viscous mass with the upper baking plate or with a die prior to closing said baking mold.

29. The process of claim 1 further comprising preheating said baking mold prior to placing the viscous mass therein.

30. The process of claim 1 wherein the baking mold includes upper and lower baking plates and further comprising placing the upper baking plate loosely on the viscous mass for a period of time sufficient to reduce water content of the viscous mass by means of evaporation, prior to closing the baking mold.

31. The process of claim 1 wherein the baking mold includes upper and lower baking plates and further comprising locking the upper and lower plates in position relative to each other to ensure a constant distance therebetween during said heating, thereby defining a wall thickness for the shaped body.

32. The process of claim 1 further comprising controlling a discharge of steam from the baking mold produced by said evaporation of the water.

33. The process of claim 32 wherein said control of discharge of steam is responsive to heating time.

34. The process of claim 1 further comprising:
    pressing the viscous mass within the heating mold at the beginning of said heating.

35. The process of claim 1 further comprising mechanically reducing the amount of water in said viscous mass prior to said heating.

36. The process of claim 1 further comprising pre-shaping viscous mass in a sieve-type mold to produce a pre-shaped blank and placing said pre-shaped blank, in the baking mold, said sieve-type mold substantially corresponding to geometry of the baking mold.

37. The process of claim 36 further comprising:

contacting the pre-shaped blank with a heated baking tong to cause water to evaporate from the viscous mass prior to the closing of the baking mold.

38. The process of claim 1 wherein the baking mold includes upper and lower baking plates and wherein said heating is accompanied by a reduction in distance between the upper and lower baking plates.

39. The process of claim 1 further comprising:

comminuting the fibrous raw material;

mixing and kneading the comminuted fibrous raw material to disintegrate the fibrous raw material into fiber bundles; and mixing said fiber bundles, as said biodegradable fiber material, with 30% by wt to 50% by wt of the starch, based on the dry weight of the biodegradable fiber material; and wherein the baking mold is in the form of cooperating baking plates and wherein the viscous mass is heated in the baking mold at a temperature of 150° C. to 200° C.

40. The process of claim 1 further comprising:

comminuting the fibrous raw material;

mixing and kneading the comminuting fibrous raw material to disintegrate the fibrous raw material into fiber bundles; and mixing said fiber bundles, as said biodegradable fiber material, with 15% by wt to 30% by wt of the starch, based on the dry weight of the biodegradable fiber material; and wherein the baking mold is in the form of cooperating baking plates and wherein the viscous mass is heated in the baking mold at a temperature of 150° C. to 200° C.

41. The process of claim 1 wherein said biodegradable fiber material is in the form of an admixture of long fibers or fiber bundles having a length ranging from 10 mm to 50 mm and short fibers or fiber bundles having a length of 0.5 mm to 20 mm.

42. The shaped body produced by the process of claim 1 wherein the ratio of said biodegradable fiber material to said starch is within the range of 4:1 to 1:2.

43. A shaped body according to claim 41 wherein said biodegradable fiber material consists of fibers or fiber bundles of a length of 0.5 mm to 5 mm.

44. The shaped body of claim 43 wherein said starch is pre-gelatinated.

45. The shaped body of claim 42 in the form of a matrix of said starch reinforced by said biodegradable fiber material.

* * * * *

UNITED STATES PATENT AND TRADEMARK OFFICE
CERTIFICATE OF CORRECTION

PATENT NO. : 5,849,152
DATED : December 15, 1998
INVENTOR(S) : Arnold et al

It is certified that error appears in the above-indentified patent and that said Letters Patent is hereby corrected as shown below:

Col. 1, line 17, "used" should read --use--; and
      line 22, "disintegratabie" should read --disintegratable--.
Col. 2, line 47, "rations" should read --ratios--.
Col. 3, line 13, before "embodiment" insert --an--;
      line 17, before "embodiment" insert --an--;
      line 42, "embodiment" should read --embodiments--;
      line 48, before "embodiment" insert --an--.
Col. 4, line 8, "embodiment" should read --embodiments--.
Col. 5, line 59, delete "of embodiment".
Col. 8, line 16, begin a new paragraph with "During"; and
      line 59, "0,5" should read --0.5--.
Col. 9, line 4, delete "of embodiment".
Col. 10, line 7, before "the" insert --of--;
      line 38, "conmbina-" should read --combina--;
      line 43, "In" should read --It--; and
      line 59, delete "of embodiment".
Col. 11, line 62, "0,5" should read --0.5--.

UNITED STATES PATENT AND TRADEMARK OFFICE
CERTIFICATE OF CORRECTION

PATENT NO. : 5,849,152
DATED : December 15, 1998
INVENTOR(S) : Arnold et al

It is certified that error appears in the above-identified patent and that said Letters Patent is hereby corrected as shown below:

```
Col. 12, line 21, "he" should read --the--; and
        line 43, delete "of embodiment".
Col. 16, line 21, "41" should read --1--.
```

Signed and Sealed this

Twenty-second Day of February, 2000

Attest:

Q. TODD DICKINSON

*Attesting Officer*  *Commissioner of Patents and Trademarks*